(12) United States Patent  (10) Patent No.: US 7,513,059 B2
Pettersson  (45) Date of Patent: Apr. 7, 2009

(54) CO-ORDINATE MEASURING MACHINE

(75) Inventor: Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 120 days.

(21) Appl. No.: 11/791,707

(22) PCT Filed: Dec. 6, 2005

(86) PCT No.: PCT/SE2005/001842

§ 371 (c)(1),
(2), (4) Date: Jun. 18, 2007

(87) PCT Pub. No.: WO2006/065200

PCT Pub. Date: Jun. 22, 2006

(65) Prior Publication Data
US 2008/0120860 A1 May 29, 2008

(30) Foreign Application Priority Data
Dec. 15, 2004 (SE) ..................................... 0403044

(51) Int. Cl.
*G01B 5/008* (2006.01)
*G01B 21/04* (2006.01)
(52) U.S. Cl. ...................................................... 33/503
(58) Field of Classification Search .................... 33/503
See application file for complete search history.

(56) References Cited

U.S. PATENT DOCUMENTS 3,749,501 A * 7/1973 Wieg ............................ 356/619
3,831,283 A * 8/1974 Pagella et al. .................. 33/559
4,727,653 A * 3/1988 Fujitani et al. ................. 33/503
4,961,267 A * 10/1990 Herzog ......................... 33/503
5,287,629 A      2/1994 Pettersson
5,646,732 A      7/1997 Gerlach
5,758,429 A      6/1998 Farzan
5,870,834 A * 2/1999 Sheldon ........................ 33/556
5,886,494 A * 3/1999 Prentice et al. .............. 318/625
6,430,828 B1 * 8/2002 Ulbrich ........................ 33/503
6,694,634 B2 * 2/2004 Sato et al. .................... 33/503
6,829,838 B1 * 12/2004 Weekers et al. ............... 33/702
2004/0182176 A1 9/2004 Huang

FOREIGN PATENT DOCUMENTS
EP         0523023         1/1993

* cited by examiner

*Primary Examiner*—Christopher W Fulton
(74) *Attorney, Agent, or Firm*—Young & Thompson

(57) ABSTRACT

A co-ordinate measuring machine to determine the co-ordinates of a number of points on the surface of a measurement object, including a support beam (4) that supports a measurement head over the surface of a support table (1) that supports the measurement object, the co-ordinates of which are to be measured. The support beam (4) is supported above the support table (1) by two legs (7, 8) that are not only possible to displace together along the support table (1) in order to displace the support beam (4) and the measurement head forwards and backwards in a direction relative to the support table (1), but also it is possible to displace the legs (7, 8) relative to each other in different directions along the support table (1) in order to raise and lower the support beam (4) and the measurement head relative to the support table.

20 Claims, 4 Drawing Sheets

CO-ORDINATE MEASURING MACHINE

The present invention relates to a co-ordinate measuring machine to determine the co-ordinates of a number of points on the surface of a measurement object, comprising a support beam that supports a measurement head above the surface of a support table that supports the measurement object the co-ordinates of which are to be determined.

The co-ordinate measuring machines that are currently available are based on Cartesian geometry, which means that they are based on three orthogonal axes that can move more or less independently of each other, the x, y and z-axes. One example of such a machine is shown in FIG. 1a, in the form of what is known as a "portal measuring machine". One of the disadvantages of this type of machine is the design that is related to movement along the z-direction. This is normally carried out through having a xz-carriage that can be displaced along the x-axis while at the same time comprising a bearing system for the z-axis. In order to obtain sufficient rigidity in the xz-carriage it is normally required that the bearing system is spread out as far as is possible. However, this means that the xz-carriage will become relatively large, with the associated high weight of the complete displacement system (the xz-carriage and the z-axis). This then, in turn, leads to the requirements for rigidity on the remainder of the structure becoming relatively severe, since the weight of the moving parts is high.

It is therefore one purpose of the present invention to achieve a co-ordinate measuring machine of the type described above in which the problems described above can be reduced, such that the dimensions of the moving parts can be reduced.

This purpose of the invention is achieved with a co-ordinate measuring machine in order to determine the co-ordinates of a number of points on the surface of a measurement object, comprising a support beam that supports a measurement head over the surface of a support table that supports the measurement object, the co-ordinates of which are to be measured, where the support beam is supported above the support table by means of two legs that it is not only possible to displace together along the support table in order to displace the support beam and the measurement head forwards and backwards in a direction relative to the support table, but also it is possible to displace the legs relative to each other in order to raise and lower the support beam and the measurement head relative to the support table.

Figure 1:
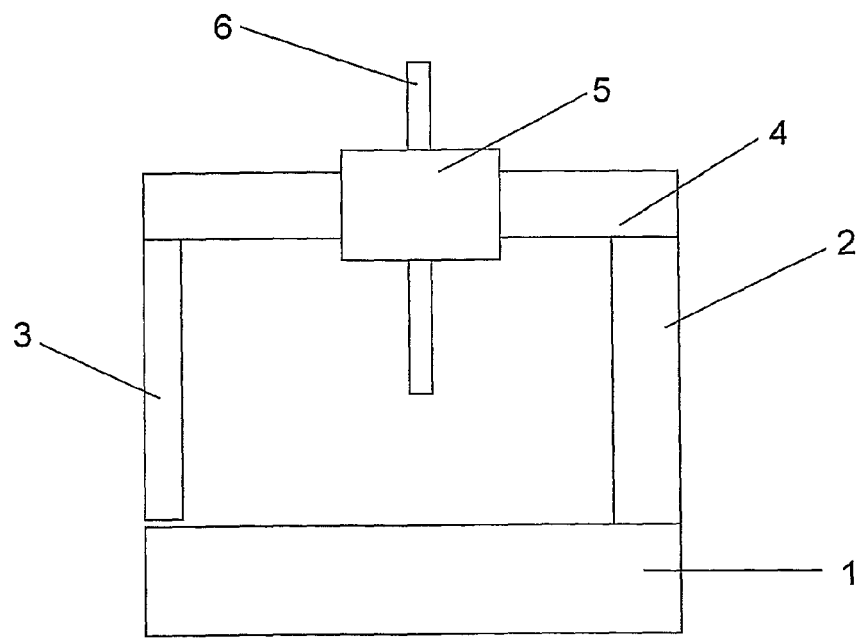
Figure 2:
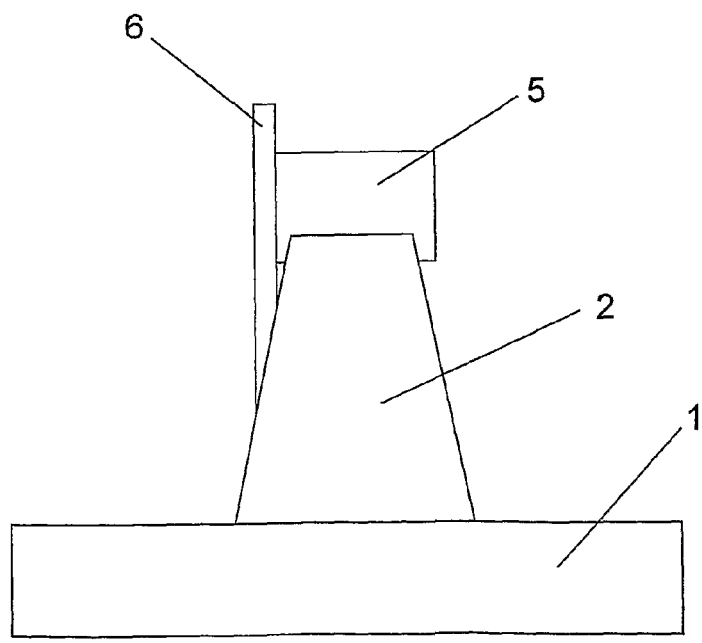
Figure 3:
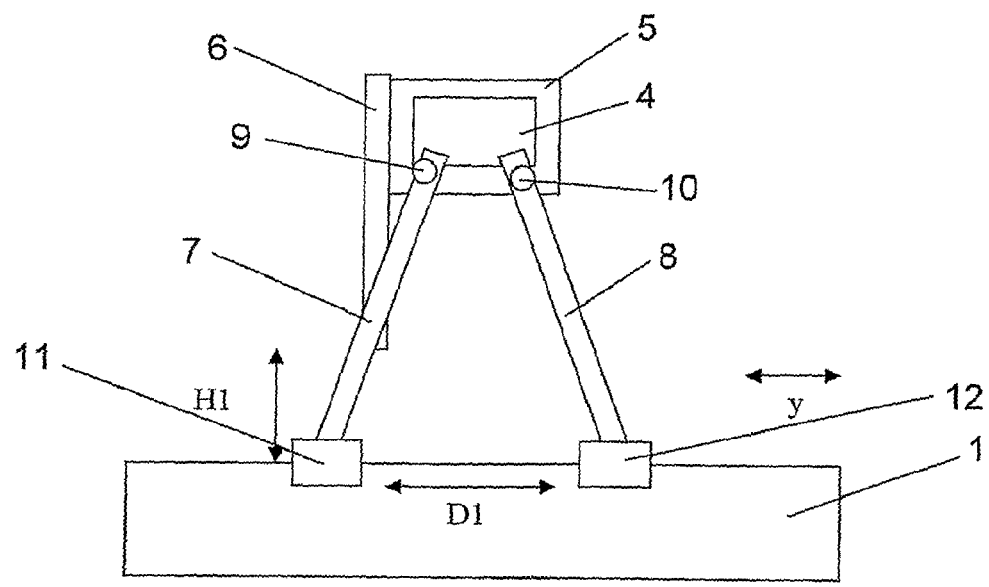
Figure 4:
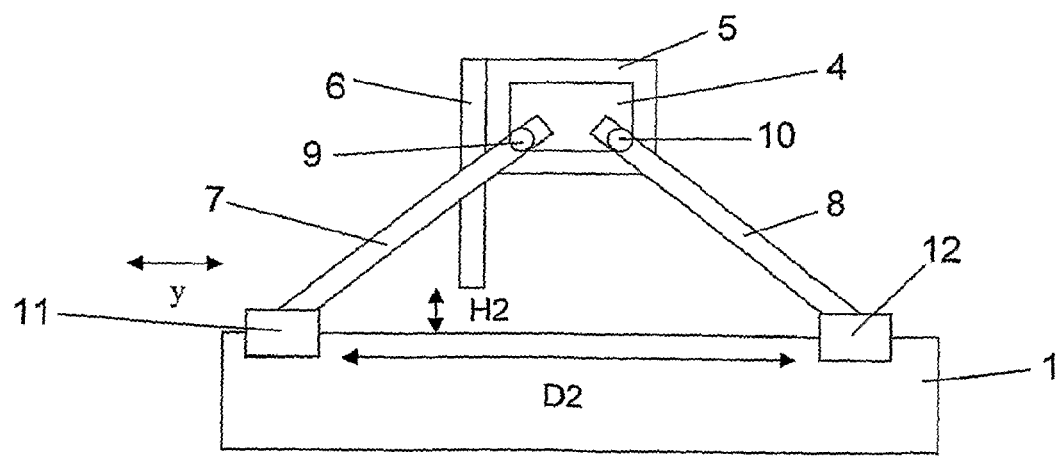
Figure 5:
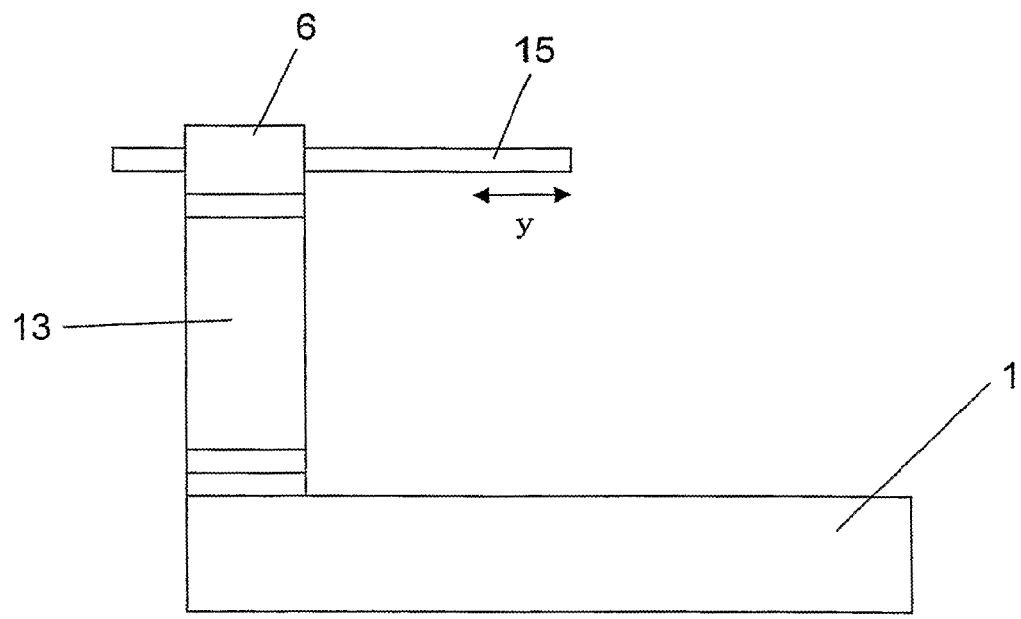
Figure 6:
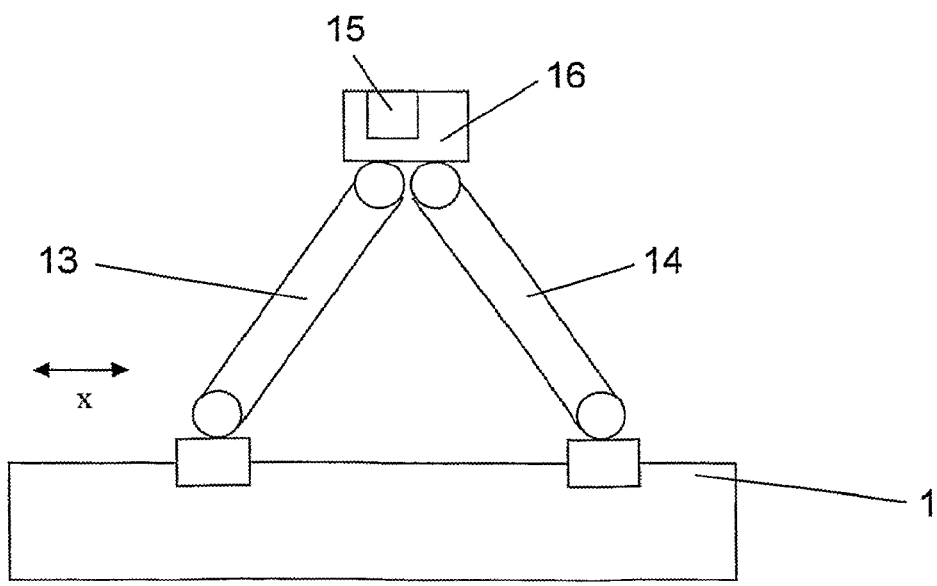
Figure 7:
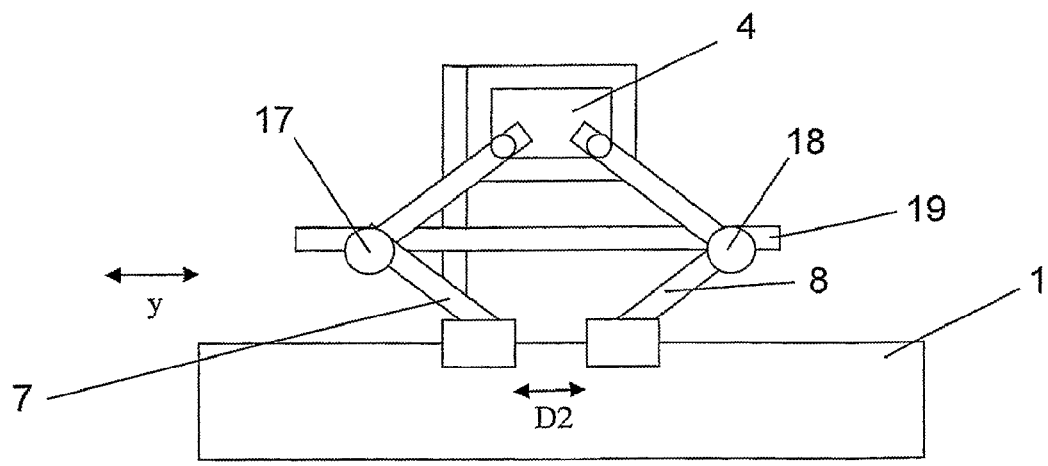
Figure 8:
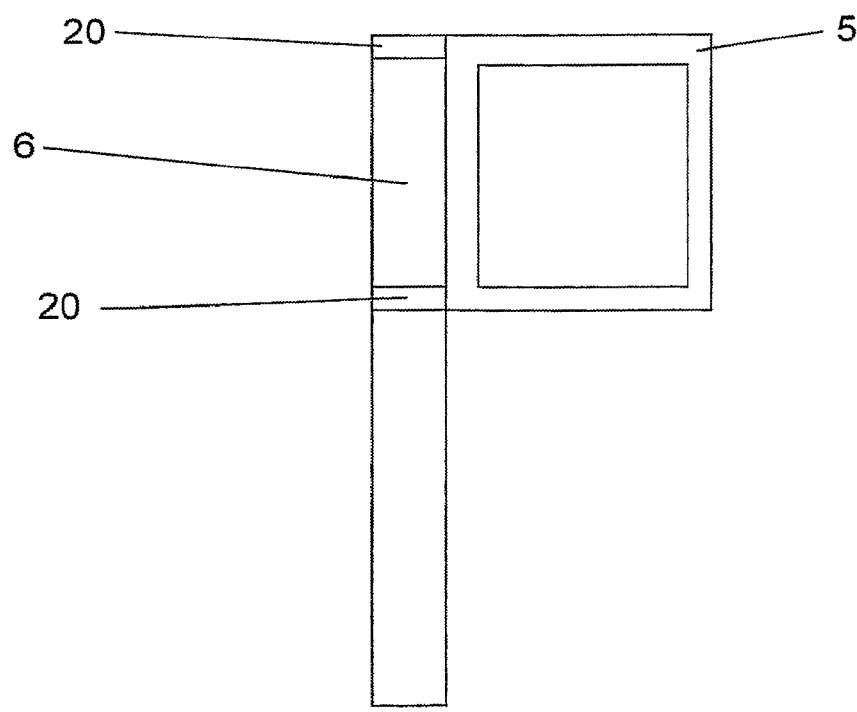

The invention will now be described in more detail in the form of non-limiting embodiments, illustrated with the aid of the attached drawings, in which FIG. 1 shows a view from the front of a traditional co-ordinate measuring machine of portal type, FIG. 2 shows a view from the side of the traditional co-ordinate measuring machine shown in FIG. 1, FIG. 3 shows a view from the front of a co-ordinate measuring machine of portal type according to the invention in a first operating position, FIG. 4 shows the co-ordinate measuring machine of FIG. 3 in a second operating position, FIG. 5 shows a view from the front of a co-ordinate measuring machine of horizontal arm type designed according to the invention, FIG. 6 shows a view from the side of the co-ordinate measuring machine in FIG. 5, FIG. 7 shows a view from the side of a co-ordinate measuring machine of portal type according to the invention in an alternative design, and FIG. 8 shows an alternative design of the attachment of the z-axis for a co-ordinate measuring machine of portal type according to the invention.

The co-ordinate measuring machine shown in FIG. 1 and FIG. 2 comprises a support table 1 along which one driving leg 2 and one support leg 3 can be displaced forwards and backwards in one direction, the y-direction. The legs 2, 3 support in their turn at their upper ends a support beam 4, whereby the support beam is located at a distance above the surface of the support table 1, which distance is determined by the lengths of the legs 2, 3. The support beam 4 supports in turn a measurement carriage 5 that can be displaced forwards and backwards along the support beam 4, along the x-direction. This measurement carriage in turn supports a vertical shaft 6, which is connected with the measurement carriage 5 such that it can be displaced upwards and downwards, along the z-direction. A measurement probe, not shown in the drawings, is arranged at the lower end of the vertical shaft in a known manner, which probe can be brought into contact with the object that is to be measured in the co-ordinate measuring machine.

The co-ordinate measuring machine according to the invention that is shown in FIG. 3 and FIG. 4, differs from that shown in FIG. 1 and FIG. 2 principally in that the legs that support the support beam 4 at a distance above the support table are designed differently and function in a different manner. The legs 7, 8 are in this case shown at one side of the support table 1, designed as separately displaceable legs that are attached to the support beam 4 in a manner that allows rotation, such that the legs 7, 8 only displace the support beam at a constant height over the support table when they are displaced in the same direction along the support table, and such that the support beam 4 will be displaced upwards away from or downwards towards the support table 1 when the legs 7, 8 are displaced in different directions along the support table 1. In this case, naturally, equivalent legs are arranged on the opposite side of the support table 1 in order to support the support beam 4 at its other end, and arranged such that they can be displaced in the same manner as the legs 7, 8.

The legs 7 and 8 are connected to the support beam 4 by self-adjusting turning bearings 9, 10 such that the support beam 4 always takes up the same angular position relative to the horizontal plane, independently of how the legs 7, 8 are displaced. The legs 7, 8 can be displaced at their lower ends along one side of the support table 1 by means of driving means 11, 12. The driving means 11, 12 may be, for example, designed as linear motors, with one magnet that is common to the two driving means and that extends along one edge of the support table 1, and with individual coils and control means for the individual driving means 11, 12. A particular height H1 between the support table 1 and the lower end of the vertical shaft 6 is obtained through displacement of the legs 7, 8 to the position that is shown in FIG. 3, where the distance between the legs is D1. The distance between the support table 1 and the lower end of the vertical shaft will be reduced to H2 if the legs 7, 8 are moved apart such that the distance between them at the surface of the support table 1 becomes D2, as is shown in FIG. 4. Thus the lower end of the vertical shaft 6 can be driven to any position at all not only in the y-direction but also in the z-direction by displacement of the legs 7, 8 together and relative to each other, within, of course, the external limitations that apply. The vertical shaft 6 can be displaced to the desired position in the x-direction with the aid of the measurement carriage that can be displaced along the support beam 4.

The driving means 11, 12 can, of course, be designed in any other manner than the linear motors mentioned above that works in practice. Thus, the driving means may, for example, be designed as toothed wheels that are displaced along a toothed rail that is arranged along the side of the support table 1. Belt-driving or worm-screw driving may also be suitable, in this case having fully separate driving systems for the two legs.

Corresponding driving systems may be arranged for the legs on the opposite side of the support table.

The measurement carriage 5 now no longer needs to comprise means for raising and lowering the vertical shaft 6 since the vertical shaft now can be raised and lowered with the aid of the legs 7, 8 that can be displaced, and for this reason not only the measurement carriage 5 but also the support beam 4 can be made with smaller dimensions and thus lower weight.

The principle of two legs that can be displaced relative to each other for the raising and lowering of the support beam that is supported over the support table can be used not only for co-ordinate measuring machines of portal type but also for co-ordinate measuring machines of horizontal arm type, as is shown in FIG. 5 and FIG. 6. The legs 13, 14 that support the horizontal arm 15 are arranged in this case only on one side of the support table 1. The legs 13, 14 act in precisely the same manner as that described above for the legs 7, 8. These legs 13, 14 support a horizontal arm holder 16, in which the horizontal arm is mounted in bearings and in which the horizontal arm can be displaced forwards and backwards in the y-direction, as is suggested by the arrow in the drawing. The horizontal arm 15 and the vertical shaft that is arranged on it can then be displaced upwards and downwards, and in the x-direction, in the manner that has been described above for a co-ordinate measuring machine of portal type.

A variant of a co-ordinate measuring machine of portal type is shown in FIG. 7 in which the legs 7, 8 are jointed in the middle with joints 17, 18 and are connected by a connector rod 19. It is appropriate that this connector rod 19 is a threaded rod or a toothed rod, interacting with rotating bushes or toothed wheels at the joints 17, 18. In that the legs 7, 8 in this variant also may be jointed in the middle a raising or a lowering of the support beam 4 and the vertical shaft 6 being possible through displacement of the joints 17, 18 towards or away from each other. It is appropriate to use this variant when unlimited space is not available for the support table 1, and it ensures that a co-ordinate measuring machine according to the invention can be designed to be compact.

FIG. 8 shows a detail of the connection between the measurement carriage 5 and the vertical shaft 6. According to one design of the invention, the vertical shaft 6 can be connected to the measurement carriage 5 with the aid of turning bearings 20, such that the vertical shaft 6 can rotate around its own axis. It is in this way possible to create a fixed measurement probe for connection at the free end of the vertical shaft 6, and avoid having a mobile probe there. A mobile measurement probe that can rotate requires driving means at the end of the vertical shaft 6, and this not only complicates the shaft but also increases the weight at the free end of the shaft. A simple turning mechanism can instead, through the invention, be arranged at the connection between the measurement carriage and the vertical shaft, in order to rotate this shaft and thus also a measurement probe arranged at the free end of the shaft. It is obvious that such a measurement probe arranged at the end of the vertical shaft, which can rotate around is axis, may be designed also as a jointed measurement probe.

Individual position sensors are arranged at each individual leg, in order to obtain the location of the different legs, and in this way be able to calculate the position of the measurement probe, while a common measurement scale may be arranged along the support table. Such a measurement scale and position sensors are, naturally, arranged also at the measurement carriage 5 in order to record its position along the support beam 4.

It is also possible with the invention to make the attachments for the legs to the support beam fixed asymmetric, whereby it becomes possible also to turn the support beam in order to make it possible to turn the complete measurement carriage. It is in this way possible to obtain greater possibilities to measure, for example, cavities in the side of a work piece that is to be measured. The vertical shaft in this case will no longer be vertical: it will rather be tilted, or it may even be parallel with the horizontal plane. A measurement probe arranged at the end of this shaft, the "vertical shaft", can then be made to penetrate into cavities in the side of the work piece, and it may penetrate even to great depths into such cavities.

The invention claimed is:

1. A co-ordinate measuring machine to determine the co-ordinates of a number of points on the surface of a measurement object, comprising a support beam (4) that supports a measurement head over the surface of a support table (1) that supports the measurement object the co-ordinates of which are to be measured, characterised in that the support beam (4) is supported above the support table (1) by means of two legs (7, 8; 13, 14) that are not only possible to displace together along the support table (1) in order to displace the support beam (4) and the measurement head forwards and backwards in a direction relative to the support table (1), but also it is possible to displace the legs (7, 8; 13, 14) relative to each other in different directions along the support table (1) in order to raise and lower the support beam (4) and the measurement head relative to the support table.

2. The co-ordinate measuring machine according to claim 1, characterised in that it is a portal measuring machine and in that it comprises one pair of support legs that it is possible to displace not only along the support table but also relative to each other.

3. The co-ordinate measuring machine according to claim 2, characterised in that the legs (7, 8; 13, 14) comprise at least partially common driving means for the displacement of the legs along the support table (1).

4. The co-ordinate measuring machine according to claim 2, characterised in that the legs (7, 8; 13, 14) comprise separate driving means (11, 12) for displacement of the legs along the support table.

5. The co-ordinate measuring machine according to claim 2, characterised in that the legs (7, 8; 13, 14) comprise separate position sensors and in that the support table comprises a measurement scale that is common to both legs.

6. The co-ordinate measuring machine according to claim 2, characterised in that the support beam (4) supports a vertical shaft (6) that is arranged such that it cannot be displaced in the vertical direction relative to the support beam (4).

7. The co-ordinate measuring machine according to claim 1, characterised in that the legs (7, 8; 13, 14) comprise at least partially common driving means for the displacement of the legs along the support table (1).

8. The co-ordinate measuring machine according to claim 7, characterised in that the driving means (11, 12) comprise a linear motor with one magnet that is common to both legs.

9. The co-ordinate measuring machine according to claim 8, characterised in that the legs (7, 8; 13, 14) comprise separate position sensors and in that the support table comprises a measurement scale that is common to both legs.

10. The co-ordinate measuring machine according to claim 8, characterised in that the support beam (4) supports a vertical shaft (6) that is arranged such that it cannot be displaced in the vertical direction relative to the support beam (4).

11. The co-ordinate measuring machine according to claim 7, characterised in that the driving means (11, 12) comprise a toothed rail and toothed wheel system, with one toothed rail that is common for both legs.

12. The co-ordinate measuring machine according to claim 11, characterised in that the legs (7, 8; 13, 14) comprise separate position sensors and in that the support table comprises a measurement scale that is common to both legs.

13. The co-ordinate measuring machine according to claim 7, characterised in that the legs (7, 8; 13, 14) comprise separate position sensors and in that the support table comprises a measurement scale that is common to both legs.

14. The co-ordinate measuring machine according to claim 7, characterised in that the support beam (4) supports a vertical shaft (6) that is arranged such that it cannot be displaced in the vertical direction relative to the support beam (4).

15. The co-ordinate measuring machine according to claim 1, characterised in that the legs (7, 8; 13, 14) comprise separate driving means (11, 12) for displacement of the legs along the support table.

16. The co-ordinate measuring machine according to claim 15, characterised in that the legs (7, 8; 13, 14) comprise separate position sensors and in that the support table comprises a measurement scale that is common to both legs.

17. The co-ordinate measuring machine according to claim 1, characterised in that the legs (7, 8; 13, 14) comprise separate position sensors and in that the support table comprises a measurement scale that is common to both legs.

18. The co-ordinate measuring machine according to claim 1, characterised in that the support beam (4) supports a vertical shaft (6) that is arranged such that it cannot be displaced in the vertical direction relative to the support beam (4).

19. The co-ordinate measuring machine according to claim 18, characterised in that the vertical shaft (6) is arranged such that it can rotate around its own axis.

20. The co-ordinate measuring machine according to claim 18, characterised in that a measurement probe is arranged at the end of the vertical shaft (6).

* * * * *